US012560103B2

(12) United States Patent
Bisson et al.

(10) Patent No.: US 12,560,103 B2
(45) Date of Patent: Feb. 24, 2026

(54) REAR-CONE EXHAUST DUCT FOR ADDITIVE MANUFACTURING

(71) Applicant: PRATT & WHITNEY CANADA CORP., Longueuil (CA)

(72) Inventors: Jocelyn Bisson, Saint-Basile-le-Grand (CA); Guy Lefebvre, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/527,843

(22) Filed: Dec. 4, 2023

(65) Prior Publication Data

US 2025/0179939 A1     Jun. 5, 2025

(51) Int. Cl.
F01D 25/30          (2006.01)
B22F 5/00           (2006.01)
(Continued)

(52) U.S. Cl.
CPC .............. F01D 25/30 (2013.01); B22F 5/009 (2013.01); B22F 10/28 (2021.01); B22F 10/47 (2021.01);
(Continued)

(58) Field of Classification Search
CPC ... F02K 1/04; F02K 1/08; F02K 1/386; F02K 1/80; F02K 1/48; F02K 1/827; F01D 25/30; F05D 2240/1281; F05D 2230/31; B64D 33/04; B22F 5/009; B22F 10/28; B22F 10/47; B33Y 10/00; B33Y 80/00
See application file for complete search history.

(56) References Cited

U.S. PATENT DOCUMENTS 2,708,340 A * 5/1955 Guest ........................ F23R 3/00
                                              60/39.23
2,809,491 A * 10/1957 Wosika ..................... F02K 1/04
                                               60/39.5
(Continued)

FOREIGN PATENT DOCUMENTS

| CN | 102032072 | 4/2011 |
|---|---|---|
| IN | 508282 | 2/2024 |
| JP | 04432565 | 3/2010 |

OTHER PUBLICATIONS

European Patent Office, European Search Report dated Apr. 9, 2025 in Application No. 24216664.3.

*Primary Examiner* — Jason H Duger
(74) *Attorney, Agent, or Firm* — SNELL & WILMER L.L.P.

(57)          ABSTRACT

A turbine exhaust case is disclosed herein. The turbine exhaust case including an outer shroud having a cylindrical shape and extending in a first direction parallel to a center of axis and extending circumferentially around the center axis, an inner shroud having frustoconical shape, the inner shroud disposed within the outer shroud, the inner shroud extending circumferentially around the center axis, a plurality of struts coupled to the outer shroud and the inner shroud, an inner cone having a frustoconical shape, the inner cone coupled to and extending into the inner shroud, the inner cone extending circumferentially around the center axis, the inner cone tapering at a first angle with respect to the center axis, the first end of the inner cone being coupled to the second end of the inner shroud, and a flat surface coupled the second end of the inner cone.

18 Claims, 7 Drawing Sheets

(51) Int. Cl.

| | |
|---|---|
| *B22F 10/28* | (2021.01) |
| *B22F 10/47* | (2021.01) |
| *B33Y 10/00* | (2015.01) |
| *B33Y 80/00* | (2015.01) |
| *B64D 33/04* | (2006.01) |
| *F02K 1/04* | (2006.01) |
| *F02K 1/08* | (2006.01) |
| *F02K 1/38* | (2006.01) |
| *F02K 1/48* | (2006.01) |
| *F02K 1/80* | (2006.01) |
| *F02K 1/82* | (2006.01) |

(52) U.S. Cl.
CPC ............... *B64D 33/04* (2013.01); *F02K 1/04* (2013.01); *F02K 1/08* (2013.01); *F02K 1/386* (2013.01); *F02K 1/48* (2013.01); *F02K 1/80* (2013.01); *F02K 1/827* (2013.01); *B33Y 10/00* (2014.12); *B33Y 80/00* (2014.12); *F05D 2230/31* (2013.01); *F05D 2240/1281* (2013.01)

(56) References Cited

U.S. PATENT DOCUMENTS

| | | | | |
|---|---|---|---|---|
| 2,928,648 | A | 3/1960 | Haines et al. | |
| 3,012,400 | A * | 12/1961 | Corson, Jr. | F02K 3/10 |
| | | | | 239/524 |
| 3,625,630 | A | 12/1971 | Soo | |
| 4,527,388 | A * | 7/1985 | Wallace, Jr. | F02K 1/09 |
| | | | | 239/265.33 |
| 9,644,497 | B2 | 5/2017 | Salunkhe et al. | |
| 10,436,447 | B2 | 10/2019 | Johnson et al. | |
| 2013/0081731 | A1* | 4/2013 | Nanda | F01D 25/30 |
| | | | | 138/44 |
| 2013/0180246 | A1* | 7/2013 | Nanda | F01D 25/30 |
| | | | | 60/697 |
| 2015/0143816 | A1 | 5/2015 | Salunkhe et al. | |
| 2018/0223693 | A1* | 8/2018 | Suciu | F02K 1/48 |
| 2019/0283136 | A1* | 9/2019 | Ruppenthal | B22F 10/66 |
| 2020/0109663 | A1* | 4/2020 | Binek | F02K 3/10 |

* cited by examiner

REAR-CONE EXHAUST DUCT FOR ADDITIVE MANUFACTURING

FIELD

The present disclosure generally relates manufacturing components for a gas turbine engine, and more particularly, to manufacturing a turbine exhaust case using an additive manufacturing process.

BACKGROUND

Gas turbine engines use a turbine exhaust case (TEC) for various purposes including holding a bearing housing, clamping turbine parts, containing rotating parts, and sealing an upstream cavity that is pressurized from a downstream cavity that is at atmospheric pressure, among others. The TEC generally consists of an inner ring and an outer ring that are connected together by struts. The inner ring tends to be closed at the rear end to ensure sealing between the upstream cavity and downstream side. Generally, the inner ring is closed by a vertical wall. Generally, the TEC inner ring closure is either as cast or is welded to the TEC inner ring.

SUMMARY

Disclosed herein is a turbine exhaust case including an outer shroud having a cylindrical shape with a first end and a second end, the outer shroud extending in a first direction parallel to a center of axis and extending circumferentially around the center axis, an inner shroud having frustoconical shape with a first end and a second end, the inner shroud disposed within the outer shroud, the inner shroud extending circumferentially around the center axis, a plurality of struts coupled to the outer shroud and the inner shroud, an inner cone having a frustoconical shape with a first end and a second end, the inner cone coupled to and extending into the inner shroud, the inner cone extending circumferentially around the center axis, the inner cone tapering at a first angle with respect to the center axis, the first end of the inner cone being coupled to the second end of the inner shroud, and a flat surface coupled the second end of the inner cone.

In various embodiments, the outer shroud has a first diameter, the first end of the inner shroud has a second diameter that is less than the first diameter, and the second end of the inner shroud has a third diameter that is less than the second diameter. In various embodiments, the first end of the inner cone has a fourth diameter and the second end of the inner cone has a fifth diameter that is less than the fourth diameter. In various embodiments, the flat surface has a first length about equal to the fifth diameter. In various embodiments, the plurality of struts are disposed around the center axis.

In various embodiments, the inner shroud tapers as it extends in the first direction. In various embodiments, the first end of the outer shroud is a first distance from the first end of the inner shroud, the second end of the outer shroud is a second distance from the second end of the inner shroud, the second distance being greater than the first distance. In various embodiments, the inner cone tapers as it extends in a second direction that is opposite the first direction. In various embodiments, the first angle is about 60°. In various embodiments, the inner shroud and the inner cone meet at an edge and the inner shroud and the inner cone form a second angle therebetween, the second angle being less than 45°.

Also disclosed herein is a process of additively manufacturing a turbine exhaust case, including additively manufacturing the turbine exhaust case on a substrate, and additively manufacturing a support structure for the a portion of the turbine exhaust case on the substrate, the turbine exhaust case includes an outer shroud having a cylindrical shape with a first end and a second end, the outer shroud extending in a first direction parallel to a center of axis and extending circumferentially around the center axis, an inner shroud having frustoconical shape with a first end and a second end, the inner shroud disposed within the outer shroud, the inner shroud extending circumferentially around the center axis, a plurality of struts coupled to the outer shroud and the inner shroud, an inner cone having a frustoconical shape with a first end and a second end, the inner cone coupled to and extending into the inner shroud, the inner cone extending circumferentially around the center axis, the inner cone tapering at a first angle with respect to the center axis, the first end of the inner cone being coupled to the second end of the inner shroud a flat surface coupled to the second end of the inner cone, the flat surface configured to be supported by the support structure during the additive manufacturing process.

In various embodiments, the additive manufacturing includes a laser powder bed fusion process. In various embodiments, the turbine exhaust case is formed as a single, monolithic component. In various embodiments, the process further includes removing, after the turbine exhaust case is built, the support structure from the flat surface, and installing the turbine exhaust case on a turbine engine. In various embodiments, the outer shroud has a first diameter, the first end of the inner shroud has a second diameter that is less than the first diameter, and the second end of the inner shroud has a third diameter that is less than the second diameter.

In various embodiments, the first end of the inner cone has a fourth diameter and the second end of the inner cone has a fifth diameter that is less than the fourth diameter. In various embodiments, the flat surface has a first length about equal to the fifth diameter.

Also disclosed herein is a turbine exhaust case including an inner cone having a frustoconical shape extending in a first direction from a first end to a second end, the first end being a flat, closed surface, the inner cone expanding in diameter from the first end to the second end, an inner shroud having a frustoconical shape extending in a second direction from a first end to a second end, the second direction being opposite the first direction, the first end of the inner shroud being coupled to the second end of the inner cone, the inner shroud expanding in diameter from the first end to the second end, a plurality of struts coupled to an outer surface of inner shroud, an outer shroud having a cylindrical shape extending in the first direction from a first end to a second end, the outer shroud being parallel to a central axis from the first end to the second end, wherein an inner surface of the outer shroud is coupled to the plurality of struts.

In various embodiments, the turbine exhaust case is a single, monolithic component. In various embodiments, the outer shroud has a first diameter, the first end of the inner shroud has a second diameter that is less than the first diameter, and the second end of the inner shroud has a third diameter that is less than the second diameter. In various embodiments, the first end of the inner cone has a fourth diameter and the second end of the inner cone has a fifth diameter that is greater than the fourth diameter.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
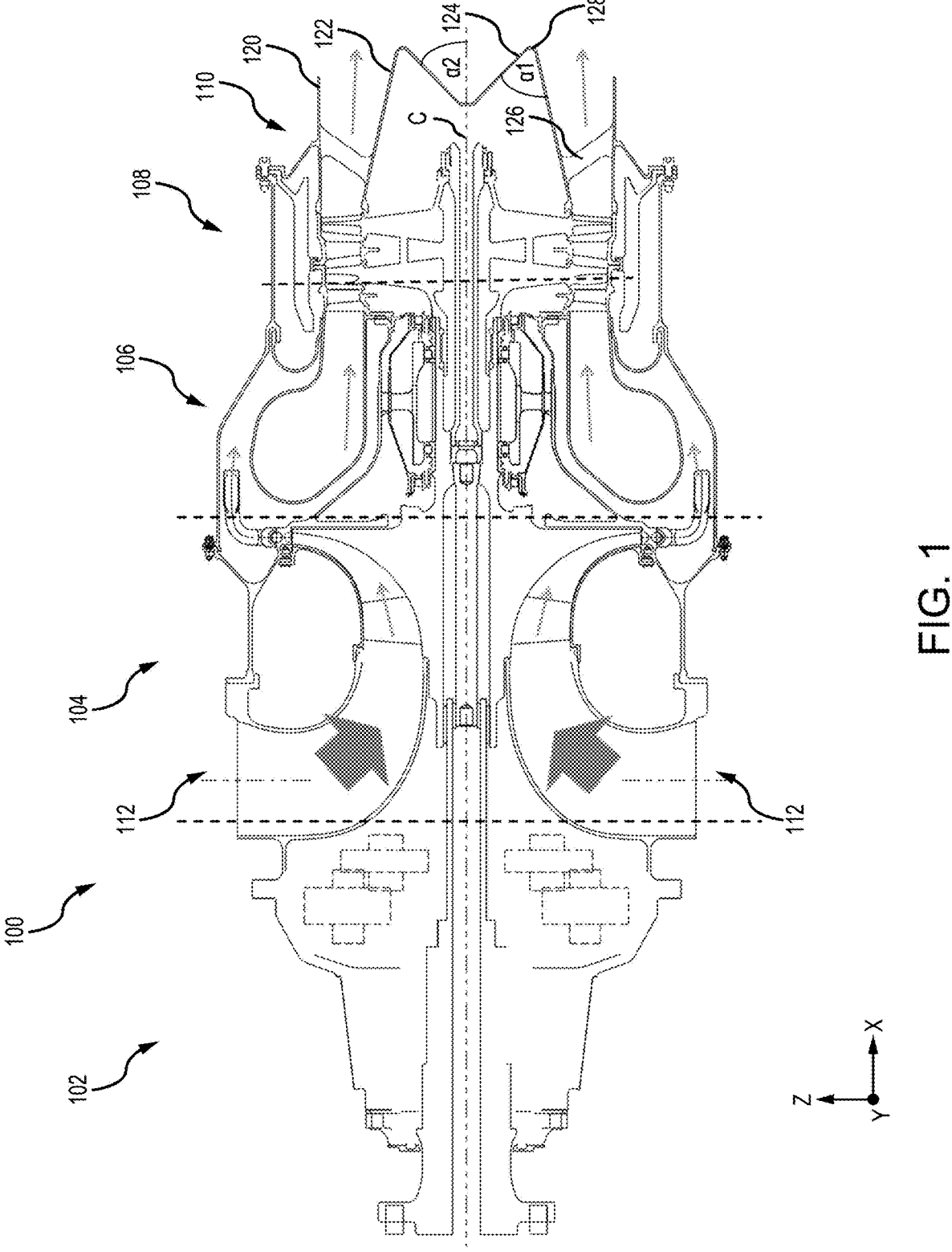
FIG. 1 illustrates a cross section of a turbine engine, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a turbine exhaust case (TEC) design that may be manufactured using an additive manufacturing process. In various embodiments, the TEC includes a reversed cone end to seal an inner ring that tends to reduce the amount of support needed during manufacturing of the TEC. Additive manufacturing of components tend to have limitations such as, for example, a 45° rule for overhanging features. In various embodiments, the TEC reversed end cone may be an overhang feature that tends to use a substructure during the additive manufacturing process. Manufacturing the substructure tends to increase the time and cost of additive manufacturing because an increased amount of powder, or other material, is used to build the substructure that is removed after the TEC is manufactured.

In various embodiments, the TEC may be manufactured using a laser powder bed fusion (LPBF) process that tends to allow more geometries than are capable with conventional manufacturing processes (e.g., casting, forming from sheet metal, machined from a solid billet, etc.). In various embodiments, the TEC design disclosed herein tends to minimize the amount of substructure used during the additive manufacturing process. In various embodiments, this tends to decrease the build time, the cost of the TEC, and the weight of the TEC. In various embodiments, the TEC may include a positive, non-reversed cone. In various embodiments, the TEC design tends to allow for the TEC to be manufactured as a single, monolithic, integral component, without the need for welding or other bonding. In various embodiments, the TEC design tends to reduce thermal stresses because of the flexible bends incorporated into the TEC design.

Referring now to FIG. 1, a turbine engine 100 is illustrated, in accordance with various embodiments. Turbine engine 100 includes a reduction gear box 102, a compressor section 104, a hot section 106, an exhaust section 108, and a turbine exhaust case (TEC) 110. Compressor section 104 is coupled to reduction gear box 102 and hot section 106 is coupled to compressor section 104. Compressor section includes one or more air inlets 112 that provide air flow for compressor section 104. Compressor section 104 compresses the air received from the one or more air inlets 112 and provides the compressed air for combustion in hot section 106. Exhaust from the combustion and uncompressed atmospheric air exit turbine engine 100 through exhaust section 108. TEC 110 is coupled to exhaust section 108 and is configured to separate and seal the pressurized upstream cavity of hot section 106 from the unpressurized atmosphere downstream of turbine engine 100.

TEC 110 includes an outer shroud 120, an inner shroud 122, and an inner cone 124. As disclosed herein, TEC 110 manufactured as a single, integral component using an additive manufacturing process. In various embodiments, the additive manufacturing process may be a laser powder bed fusion (LPBF). Outer shroud 120 is coupled to inner shroud 122 by a plurality of struts 126. Inner cone 124 is coupled to inner shroud 122 circumferentially about an edge 128 of inner shroud 122 and inner cone 124. Point 128 is a sharp radius having a first angle $\alpha1$, ensuring a stable transition for the exhaust gases. In various embodiments, first angle $\alpha1$ may be about 10° to about 75°, and more specifically, about 30° to about 60°, and more specifically about 55°. Inner cone 124 is constructed having a second angle $\alpha2$ from a centerline C of turbine engine 100. In various embodiments, second angle $\alpha2$ is about 10° to about 45°, and more specifically, about 45°. Second angle $\alpha2$ allows inner cone 124 to support itself during the additive manufacturing process, thereby reducing the amount of material used for support structure. However, there is a tradeoff between the value of second angle $\alpha2$ and the size of TEC 110. A smaller second angle $\alpha2$ tends to result in inner shroud 122 and inner cone 124 being longer (e.g., in the positive x-direction).

Figure 2A:
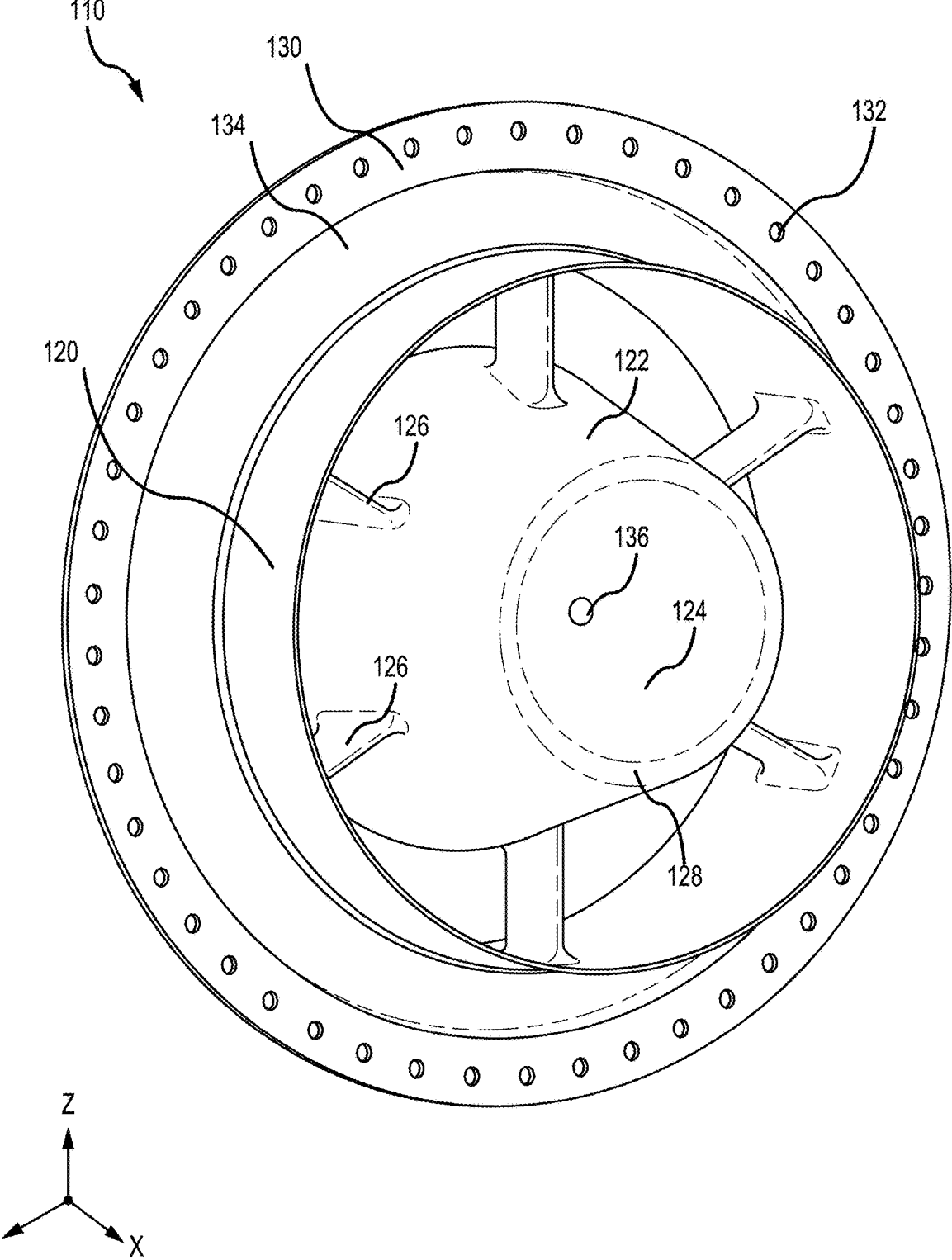
FIGS. 2A, 2B, 2C, 2D, and 2E illustrate different views of an exhaust case for use with a turbine engine, in accordance with various embodiments.
Figure 2B:
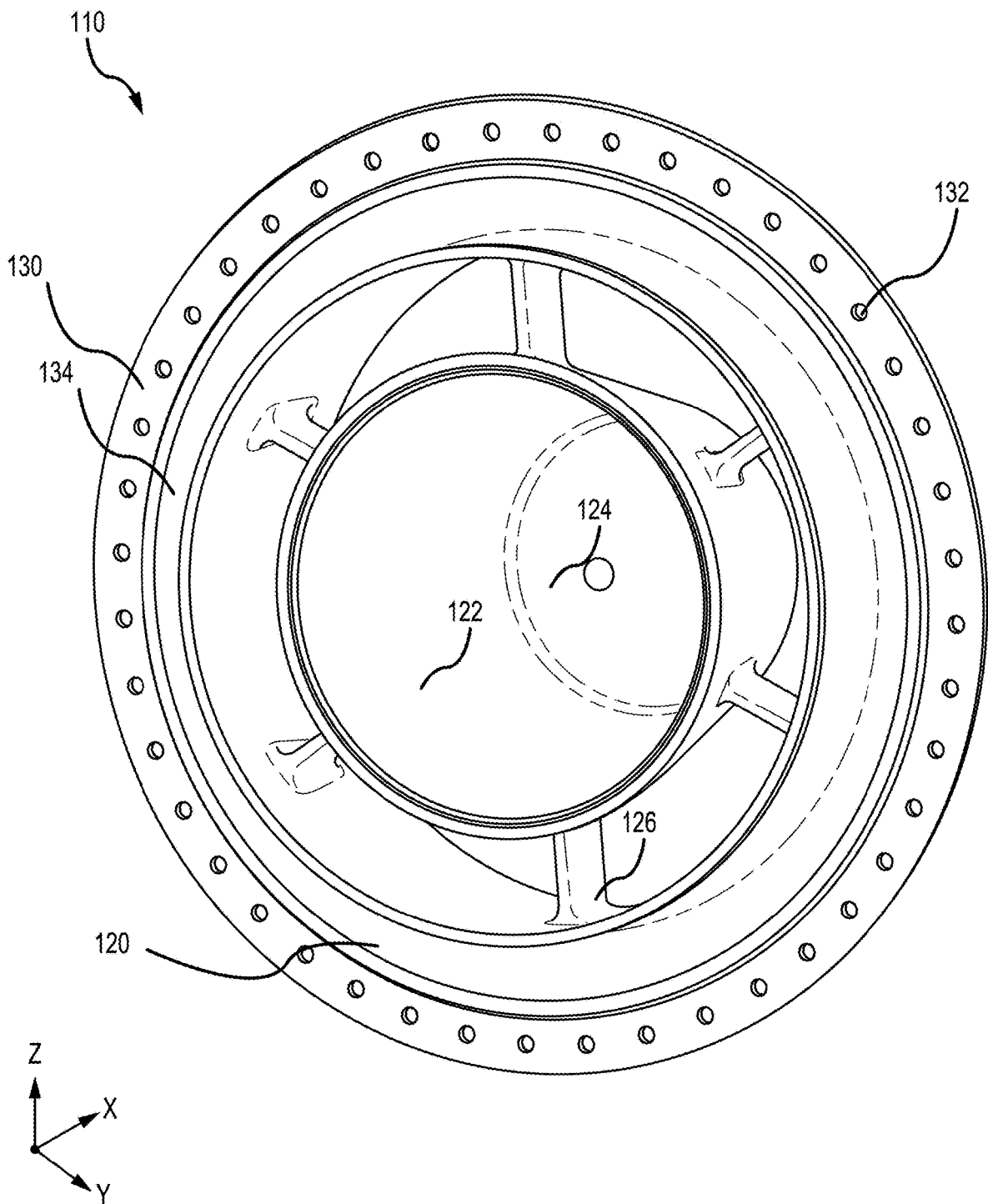
Figure 2C:
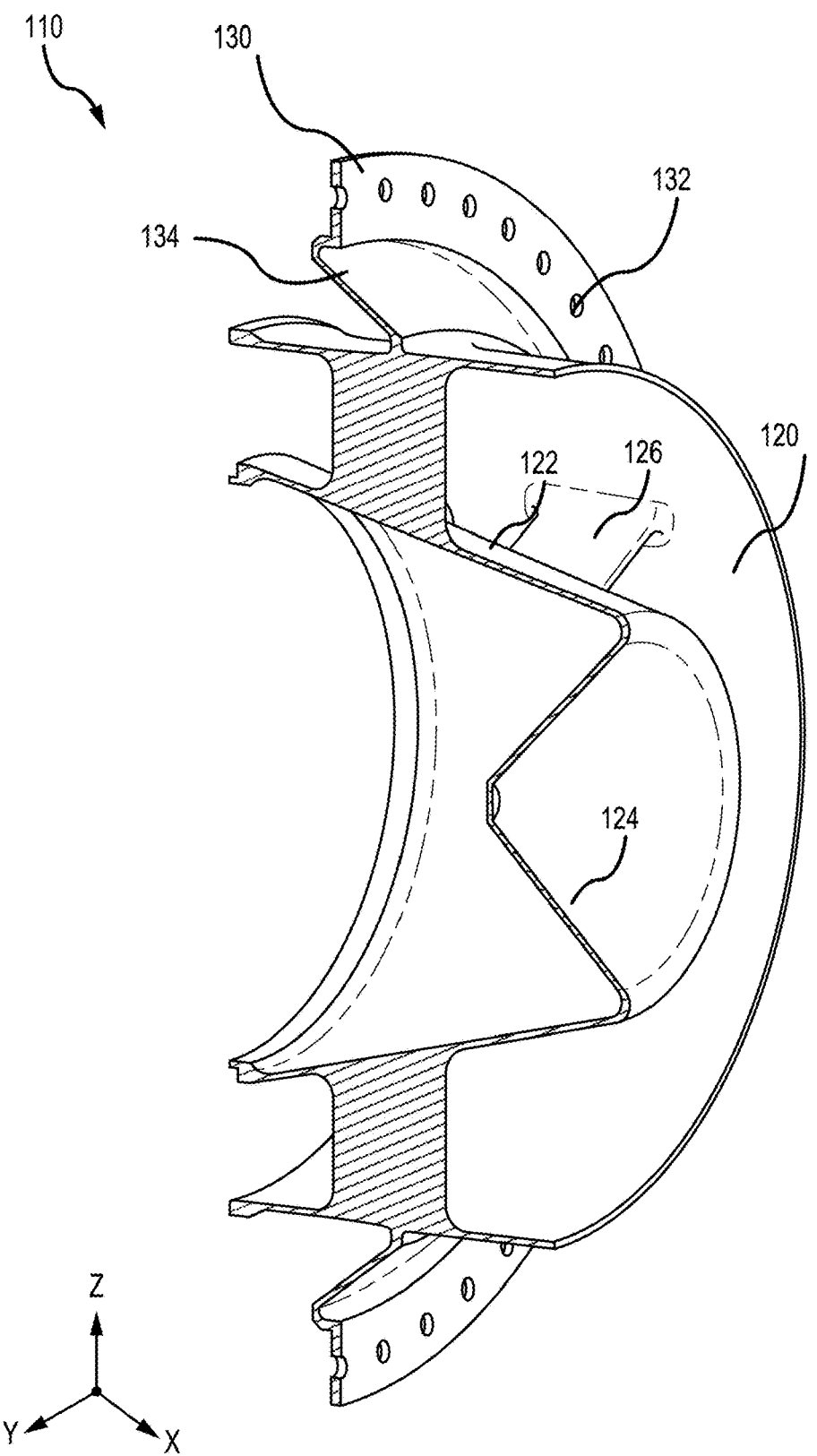
Figure 2D:
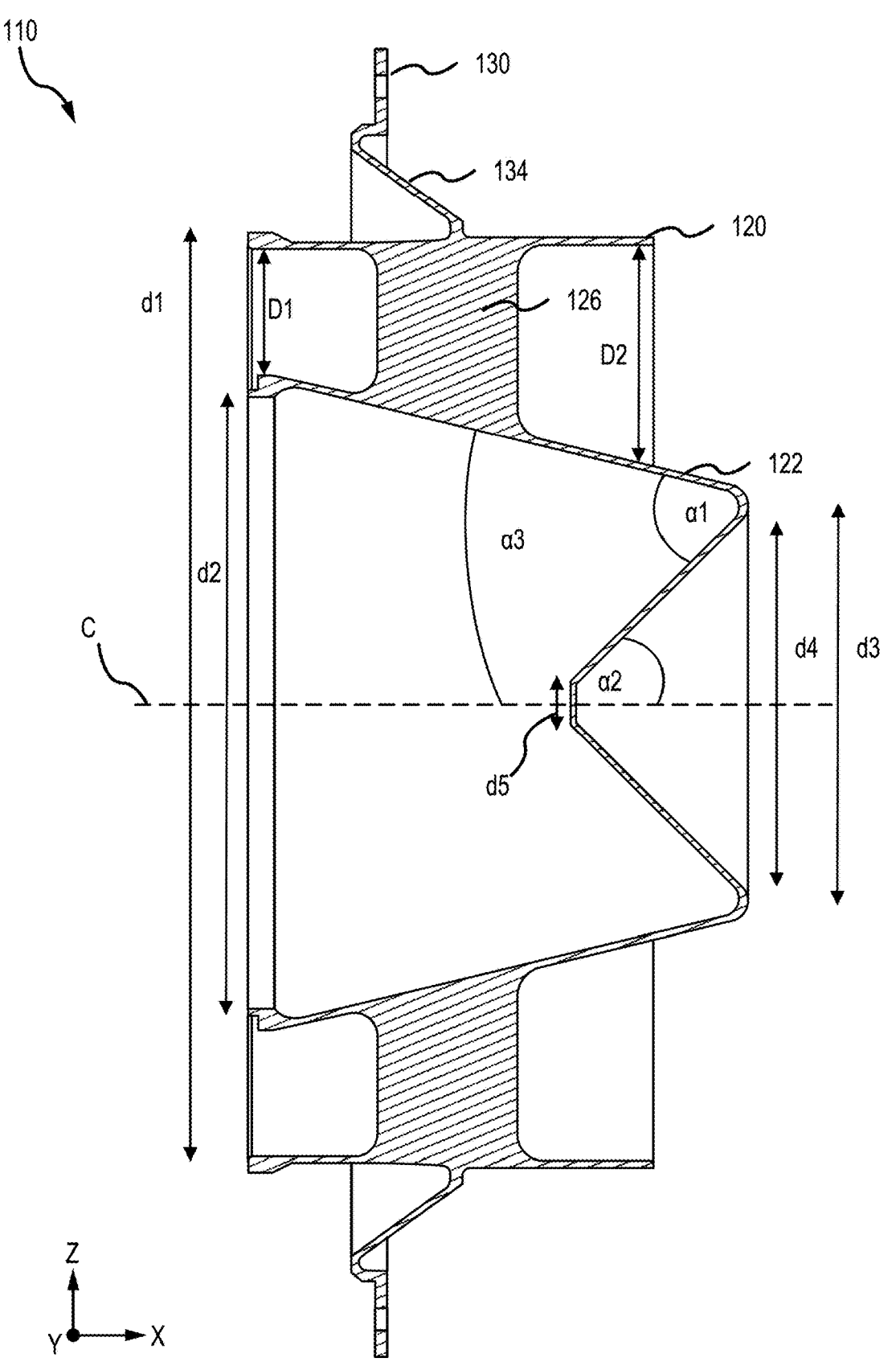
Figure 2E:
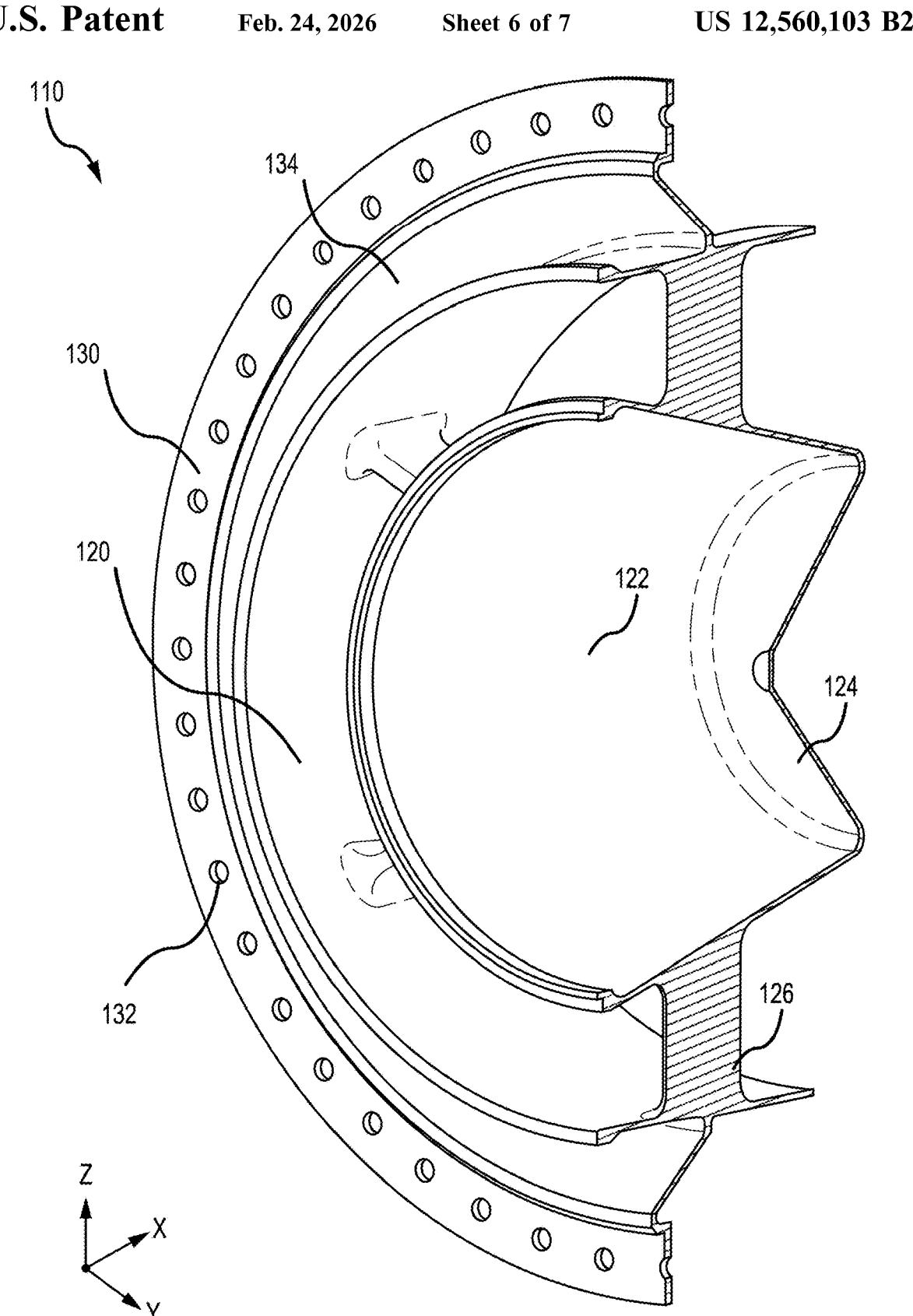

Referring now to FIGS. 2A-2E, various views of turbine exhaust case (TEC) 110 are illustrated, in accordance with various embodiments. FIG. 2A is a perspective view from the aft side of TEC 110 (e.g., from the positive x-direction), FIG. 2B is a perspective view from the forward side of TEC 110 (e.g., from the negative x-direction), FIG. 2C is a cross section perspective view from the aft side of TEC 110, FIG. 2D is a cross section side view of TEC 110, and FIG. 2E is a cross section perspective view from the forward side of TEC 110. TEC 110 includes outer shroud 120, inner shroud 122, inner cone 126, struts 126, and edge 128, as previously mentioned. TEC 110 further includes a coupling ring 130, fastening holes 132, and a connector ring 134.

Connector ring 134 is coupled to outer shroud 120 at one end and coupled to coupling ring 130 at an opposite end. Connector ring 134 circumferentially surrounds outer shroud 120 and coupling ring 130 circumferentially surrounds connector ring 134. Fastening holes 132 are disposed around an outer circumference of coupling ring 130. TEC 110 may be coupled to turbine engine 100 by a plurality of fasteners extending through fastening holes 132 and into turbine engine 100.

Outer shroud 120 is cylindrically shaped and extends circumferentially around and parallel to center axis C in a first direction (e.g., the positive x-direction). Outer shroud 120 has a first diameter d1.

Inner shroud 122 is frustoconical, or cone shaped, and extends circumferentially around center axis C. Inner shroud 122 has a first end having a second diameter d2 and a second end having a third diameter d3. Second diameter d2 is less than first diameter and third diameter d3 is less than second diameter d2. That is, inner shroud 122 tapers from the first end to the second end (e.g., in the positive x-direction). Inner shroud 122 fits within outer shroud 120. The taper of inner shroud 122 may be defined as a third angle $\alpha3$ from inner shroud 122 to center axis C. Third angle $\alpha3$ is less than first angle $\alpha1$ between inner shroud 122 and inner cone 124. In various embodiments, third angle $\alpha3$ may be about –30° to about 45°, and more specifically, about –15° to about 30°.

Struts 126 are coupled to outer shroud 120 and inner shroud 122. In other words, outer shroud 120 is coupled to inner shroud 122 by struts 126. There is a first distance D1 from the first end of outer shroud 120 (e.g., in the negative x-direction) to the first end of inner shroud 122 and a second distance D2 from the second end of outer shroud 120 (e.g., in the positive x-direction) to the second end of inner shroud 122. In the illustrated embodiment, first distance D1 is less than second distance D2 because of the taper of inner shroud 122. In various embodiments, inner shroud 122 may be cylindrically shaped and outer shroud 120 may be frusto-conical, or cone shaped, opening aft (e.g., in the positive x-direction). In such embodiments, first distance D1 is less than second distance D2 because of the taper of outer shroud 120.

Inner cone 124 is frustoconical, or cone shaped, and extends circumferentially around center axis C. Inner cone 124 has a first end having a fourth diameter d4 (e.g., in the positive x-direction) and a second end having a fifth diameter d5 (e.g., in the negative x-direction). Fifth diameter d5 is less than fourth diameter d4. That is, inner cone 124 tapers from the first end to the second end (e.g., in the negative x-direction). Inner cone 124 fits within inner shroud 122. The first end of inner cone 124 is coupled to the second end of inner shroud 122 at edge 128. The taper of inner cone 124 may be defined as second angle $\alpha2$ from center axis C. In various embodiments, second angle $\alpha2$ may be about 10° to about 45°, and more specifically, about 45°. Angle $\alpha2$ is at least 45° so that inner cone 124 is able to support itself during the additive manufacturing process. Inner cone 124 has a sealed, flattened end 136.

It will be appreciated that while each portion of TEC 110 is described separately, TEC 110 is designed to be additively manufactured as a single, monolithic component. The benefits the design of TEC 110 include faster manufacturing times, less material used, and a lower manufacturing cost. The sizes of the different portions of TEC 110 are relative so that the TEC 110 may be scaled up or down to fit different use cases. The use of inner cone 124 allows TEC 110 to be additively manufactured economically and with less post processing than traditional additive manufacturing designs.

It will be appreciated that other embodiments of TEC 110 than the illustrated embodiments are possible. For example, and in various embodiments, inner shroud 122 may be cylindrically shaped, having a constant diameter along axis C. In various embodiments, inner shroud 122 may be frustoconical with the aft end (e.g., in the positive x-direction) having a larger diameter than the forward end (e.g., in the negative x-direction). In various embodiments, outer shroud 120 may be frustoconical, being tapered toward the forward end or the aft end.

Figure 3:
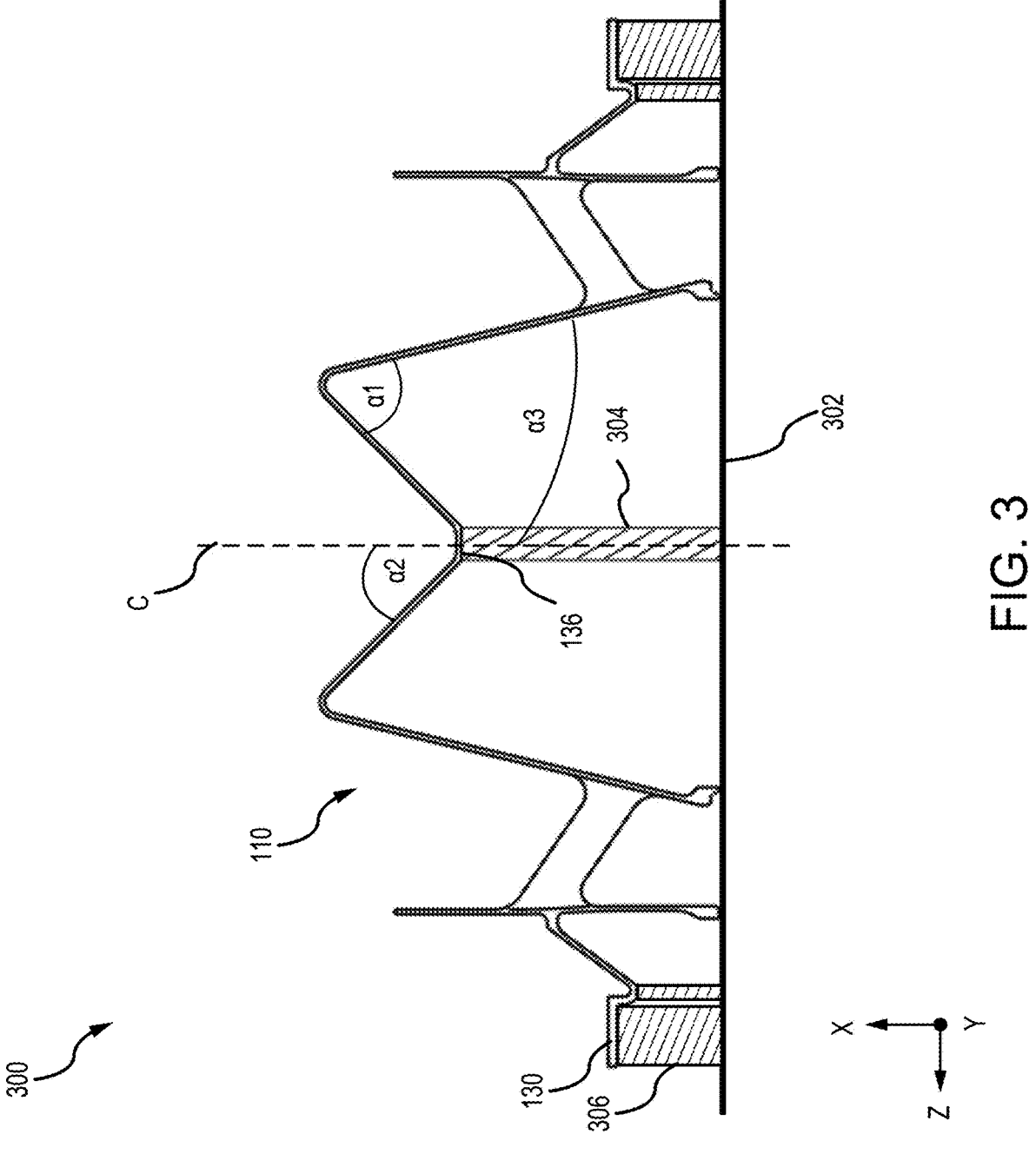
FIG. 3 illustrates a cross section view of an exhaust case after being manufactured using an additive manufacturing process, in accordance with various embodiments.

Referring now to FIG. 3, a cross section side view of an additive manufacturing process 300 of turbine exhaust case (TEC) 110 after being additively manufactured is illustrated, in accordance with various embodiments. In various embodiments, additive manufacturing process 300, may be a laser powder bed fusion (LPBF). TEC 110 is built so that the vertical of the build process corresponds to the aft of TEC 110. That is, the positive x-direction as illustrated in FIG. 3 corresponds to the up direction that is conventionally considered to be the positive z-direction. This enables TEC 110 to support itself during additive manufacturing process 300. As illustrated in FIG. 3, the design of TEC 110 minimizes the amount of support structure 304 used during additive manufacturing process 300. Support structure 304 is built layer by layer along with TEC 110 and extends from substrate 302 to flattened end 136 of inner cone 124. After flattened end 136 is built, inner cone 124 is able to support itself during the remainder of additive manufacturing process 300 because inner cone 134 tapers at second angle $\alpha2$. Support structures 306 are present to support coupling ring 130 during the build process and are removed after the build is completed.

The completed TEC 110, including support structures 304, 306, undergoes further manufacturing steps. Support structures 304, 306 are removed from TEC 110 and TEC 110 may be machined and/or finished to clean up the areas of contact where support structures 304, 306 previously connected to TEC 110. Additional machining steps may be performed to finish the surface of TEC 110, form bolt holes in TEC 110, and/or to maintain tolerances of TEC 110, among others. TEC 110 may then be installed onto a turbine engine (e.g., turbine engine 100).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and include values that are within 5% of a stated value. Additionally, the terms "substantially," "about" or "approximately" as used herein represent an amount close to the stated amount that still performs a desired function or achieves a desired result. For example, the term "substantially," "about" or "approximately" include an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

8

What is claimed is:

1. A turbine exhaust case, comprising:
a coupling ring;
an outer shroud having a cylindrical shape with a first end and a second end, the outer shroud extending in a first direction parallel to a center axis and extending circumferentially around the center axis;
a connector ring coupling the coupling ring to the outer shroud, the connector ring angled with respect to the outer shroud;
an inner shroud having frustoconical shape with a first end and a second end, the inner shroud disposed within the outer shroud, the inner shroud extending circumferentially around the center axis;
a plurality of struts coupled to the outer shroud and the inner shroud;
an inner cone having a frustoconical shape with a first end and a second end, the inner cone coupled to and extending into the inner shroud, the inner cone extending circumferentially around the center axis, the inner cone tapering at a first angle with respect to the center axis, the first end of the inner cone being coupled to the second end of the inner shroud via a circumferential edge defined by a radius;
a first flat surface coupled to the second end of the inner cone; and
a second flat surface formed by at least a portion of the coupling ring,
wherein the coupling ring, the outer shroud, the connector ring, the inner shroud, the plurality of struts, and the inner cone are monolithically formed such that each strut of the plurality of struts and is monolithically formed with the inner shroud and the outer shroud at a fixed distance between the first end and the second end of the outer shroud, extends perpendicular from the outer shroud toward the inner shroud, and terminates at the inner shroud at intervals around the center axis.

2. The turbine exhaust case of claim 1,
wherein the outer shroud is cylindrically shaped and has a first diameter,
wherein the first end of the inner shroud has a second diameter that is less than the first diameter, and
wherein the second end of the inner shroud has a third diameter that is less than the second diameter.

3. The turbine exhaust case of claim 2, wherein the first end of the inner cone has a fourth diameter and the second end of the inner cone has a fifth diameter that is less than the fourth diameter.

4. The turbine exhaust case of claim 3, wherein the first flat surface has a first length equal to the fifth diameter.

5. The turbine exhaust case of claim 1, wherein the inner shroud tapers as it extends in the first direction.

6. The turbine exhaust case of claim 1, wherein the first end of the outer shroud is a first distance from the first end of the inner shroud,
wherein the second end of the outer shroud is a second distance from the second end of the inner shroud, the second distance being greater than the first distance.

7. The turbine exhaust case of claim 1, wherein the inner cone tapers as it extends in a second direction that is opposite the first direction.

8. The turbine exhaust case of claim 1, wherein the first angle is 45°.

9. The turbine exhaust case of claim 1, wherein the inner shroud and the inner cone meet at the circumferential edge and the inner shroud and the inner cone form a second angle therebetween, the second angle being less than 75°, wherein the circumferential edge has a continuous curvature from the inner cone to the inner shroud.

10. A process of additively manufacturing a turbine exhaust case, comprising:

additively manufacturing the turbine exhaust case on a substrate; and additively manufacturing a support structure for a portion of the turbine exhaust case on the substrate, wherein the turbine exhaust case includes:

an outer shroud having a cylindrical shape with a first end and a second end, the outer shroud extending in a first direction parallel to a center axis and extending circumferentially around the center axis;

a coupling ring disposed circumferentially around the outer shroud;

a connector ring disposed at an angle to the outer shroud and coupling the coupling ring to the outer shroud;

an inner shroud having frustoconical shape with a first end and a second end, the inner shroud disposed within the outer shroud, the inner shroud extending circumferentially around the center axis;

a plurality of struts coupled to the outer shroud and the inner shroud, wherein each strut of the plurality of struts and is integrally formed with the inner shroud and the outer shroud at a fixed distance between the first end and the second end of the outer shroud, extends perpendicular from the outer shroud toward the inner shroud, and terminates at the inner shroud at intervals around the center axis;

an inner cone having a frustoconical shape with a first end and a second end, the inner cone coupled to and extending into the inner shroud, the inner cone extending circumferentially around the center axis, the inner cone tapering at a first angle with respect to the center axis, the first end of the inner cone being coupled to the second end of the inner shroud via a circumferential edge defined by a radius;

a first flat surface coupled to the second end of the inner cone; and a second flat surface formed by at least a portion of the coupling ring, the first flat surface and the second flat surface configured to be supported by the support structure during the additive manufacturing process, wherein the coupling ring, the outer shroud, the connector ring, the inner shroud, the plurality of struts, and the inner cone are monolithically formed during the additively manufacturing of the turbine exhaust case.

11. The process of additively manufacturing the turbine exhaust case of claim 10, wherein the additive manufacturing includes a laser powder bed fusion process.

12. The process of additively manufacturing the turbine exhaust case of claim 11, further comprising:

removing, after the turbine exhaust case is built, the support structure from the first flat surface and the second flat surface; and installing the turbine exhaust case on a turbine engine.

13. The process of additively manufacturing the turbine exhaust case of claim 11, wherein the outer shroud is cylindrically shaped and has a first diameter, wherein the first end of the inner shroud has a second diameter that is less than the first diameter, and wherein the second end of the inner shroud has a third diameter that is less than the second diameter.

14. The process of additively manufacturing the turbine exhaust case of claim 13, wherein the first end of the inner cone has a fourth diameter and the second end of the inner cone has a fifth diameter that is less than the fourth diameter.

15. The process of additively manufacturing the turbine exhaust case of claim 14, wherein the flat surface has a first length equal to the fifth diameter.

16. A turbine exhaust case, comprising:

an inner cone having a frustoconical shape extending in a first direction from a first end to a second end, the first end being a flat, closed surface, the inner cone expanding in diameter from the first end to the second end;

an inner shroud having a frustoconical shape extending in a second direction from a first end to a second end, the second direction being opposite the first direction, the first end of the inner shroud being coupled to the second end of the inner cone via a circumferential edge defined by a radius, the inner shroud expanding in diameter from the first end to the second end;

a plurality of struts coupled to an outer surface of inner shroud;

an outer shroud having a cylindrical shape extending in the first direction from a first end to a second end, the outer shroud being parallel to a central axis from the first end to the second end, wherein an inner surface of the outer shroud is coupled to the plurality of struts;

a coupling ring defining a plurality of fastening holes; and a connector ring coupling the coupling ring to the outer shroud, the connector ring angled with respect to the outer shroud, wherein each of the inner cone, the inner shroud, the plurality of struts, the outer shroud, the coupling ring, and the connector ring are monolithically formed such that each strut of the plurality of struts is monolithically formed with the inner shroud and the outer shroud at a fixed distance between the first end and the second end of the outer shroud, extends perpendicular from the outer shroud toward the inner shroud, and terminates at the inner shroud at intervals around the center axis.

17. The turbine exhaust case of claim 16, wherein the outer shroud is cylindrically shaped and has a first diameter, wherein the first end of the inner shroud has a second diameter that is less than the first diameter, and wherein the second end of the inner shroud has a third diameter that is greater than the second diameter.

18. The turbine exhaust case of claim 16, wherein the first end of the inner cone has a fourth diameter and the second end of the inner cone has a fifth diameter that is greater than the fourth diameter.

* * * * *